United States Patent [19]

Faulconer

[11] Patent Number: 4,809,550
[45] Date of Patent: Mar. 7, 1989

[54] DIGITAL DIVING METER

[75] Inventor: Mark Faulconer, Costa Mesa, Calif.

[73] Assignee: U.S.D. Corp, Santa Ana, Calif.

[21] Appl. No.: 946,526

[22] Filed: Dec. 23, 1986

[51] Int. Cl.[4] ............................................. G01F 23/14
[52] U.S. Cl. ....................................... 73/300; 73/431; 73/865.1; 73/866.3
[58] Field of Search ................. 73/300, 299, 301, 431, 73/865.1, 866.3, 756; D10/85, 101, 102, 46, 74, 124, 125

[56] References Cited

U.S. PATENT DOCUMENTS

| | | | |
|---|---|---|---|
| 3,857,283 | 12/1974 | Jennings et al. | 73/300 |
| 3,888,127 | 6/1975 | Shamlian et al. | 73/431 |
| 4,197,747 | 4/1980 | Koehler | 73/431 |
| 4,352,168 | 9/1982 | Anderson | 73/300 |
| 4,466,283 | 8/1984 | Osterhout | 73/300 |
| 4,491,015 | 1/1985 | Allemano | 73/756 |

FOREIGN PATENT DOCUMENTS 128113  10/1980  Japan .................................... 73/300

Primary Examiner—William A. Cuchlinski, Jr.
Assistant Examiner—Patrick R. Scanlon
Attorney, Agent, or Firm—George F. Bethel; Patience K. Bethel

[57] ABSTRACT

The disclosure in the specification sets forth a digital diving meter providing information on an axis to be readily observed in reading the information along the axial line of the display. The display is incorporated within the diving meter movement having a cover thereover. The cover comprises a cover for the digital dive meter having a handle extending therefrom at an axis form the axial line of display for ease of holding and reading the information.

17 Claims, 2 Drawing Sheets

4,809,550

DIGITAL DIVING METER

BACKGROUND OF THE INVENTION

This invention pertains to a diving meter. More particularly, it pertains to a diving depth gauge or meter of the type which provides digital information to a viewer. The digital information can be obtained as to respective pressures of the tank pressure, as well as the surrounding ambient pressure. This can be obtained by means of analog to digital conversion from an analog reading of a pressure source. This is known in the art with regard to providing for a reading of ambient pressure in a depth situation as well as pressure of breathing gas within a diver's tank.

THE PRIOR ART

The known prior art pertaining to depth gauges or meters resides within various digital depth gauges or meters that have been used and are on the market. Such digital depth gauges or meters incorporate various means of reading the respective pressures of the breathing gas in a tank as well as ambient pressure. Such meters function to calculate in some cases the dive time remaining based upon breathing gas in the high pressure tank as well as appropriate times at certain depths or how long one should remain at such depths.

The simpler digital pressure gauges or meters merely provide tank pressure and ambient pressure which is analogized to depth in the readout. They also in some cases provide the time of the dive, as well as the times at certain depths including the time at the bottom of the dive.

When such gauges or meters are utilized, it is common to read them by picking them from a storage pocket. In some cases they merely dangle or hang from the end of a line connected to a source of high pressure gas which is connected to the gas pressure within the tank.

When handling such digital depth gauges or meters they have been relatively difficult to manipulate and turn toward one's view. This is particularly true in the restrictive aspects of diving due to the fact that diving takes place within a particularly cumbersome environment due to the equipment as well as the surroundings. Thus, it has been found that an improvement in reading digital depth gauges or meters would be a substantial improvement as to convenience and safety for a diver.

This invention is directed toward providing easily read information on a depth gauge or meter by an angular configuration which creates information on a readout that can be easily manipulated and handled by a diver. This will be borne out and seen in the respective portions of this application which follow.

SUMMARY OF THE INVENTION

In summation, this invention comprises a digital depth gauge or meter having information on a readout which can be viewed by a diver at an easily readable and accessable position.

More particularly, it encompasses a digital depth gauge or meter having a face plate. The face plate incorporates information thereon such as tank pressure, maximum depth, bottom time, dive time remaining, and other information. This is presented based upon an output by electronic means.

The information is presented on a screen to a user, which is encapsulated within a boot or cover for the electronics as well as the screen.

A portion of the boot or cover is angled at its neck within the range of 10° to 80° from the axis of the line of direction of the information that is to be read on the gauge or meter. This angled configuration is in the form of an angular encapsulation or neck for providing a handle to a user. This handle for the user is such wherein the user can manipulate and hold the pressure gauge to view the material presented thereon in an easy and facile manner.

The angular configuration is such wherein it is enhanced by having ribs to provide a gripping surface for a user.

The entire configuration enhances the overall ability to use and read information on a digital depth gauge or meter by a diver. It should be viewed as a different configuration and a substantial improvement over the prior art of digital depth gauges and meters as to configuration and presentation of information.

BRIEF DESCRIPTION OF THE DRAWINGS

The invention will be more clearly understood by reference to the description below taken in conjunction with the accompanying drawings wherein.

DESCRIPTION OF THE PREFERRED EMBODIMENTS

Figure 1:
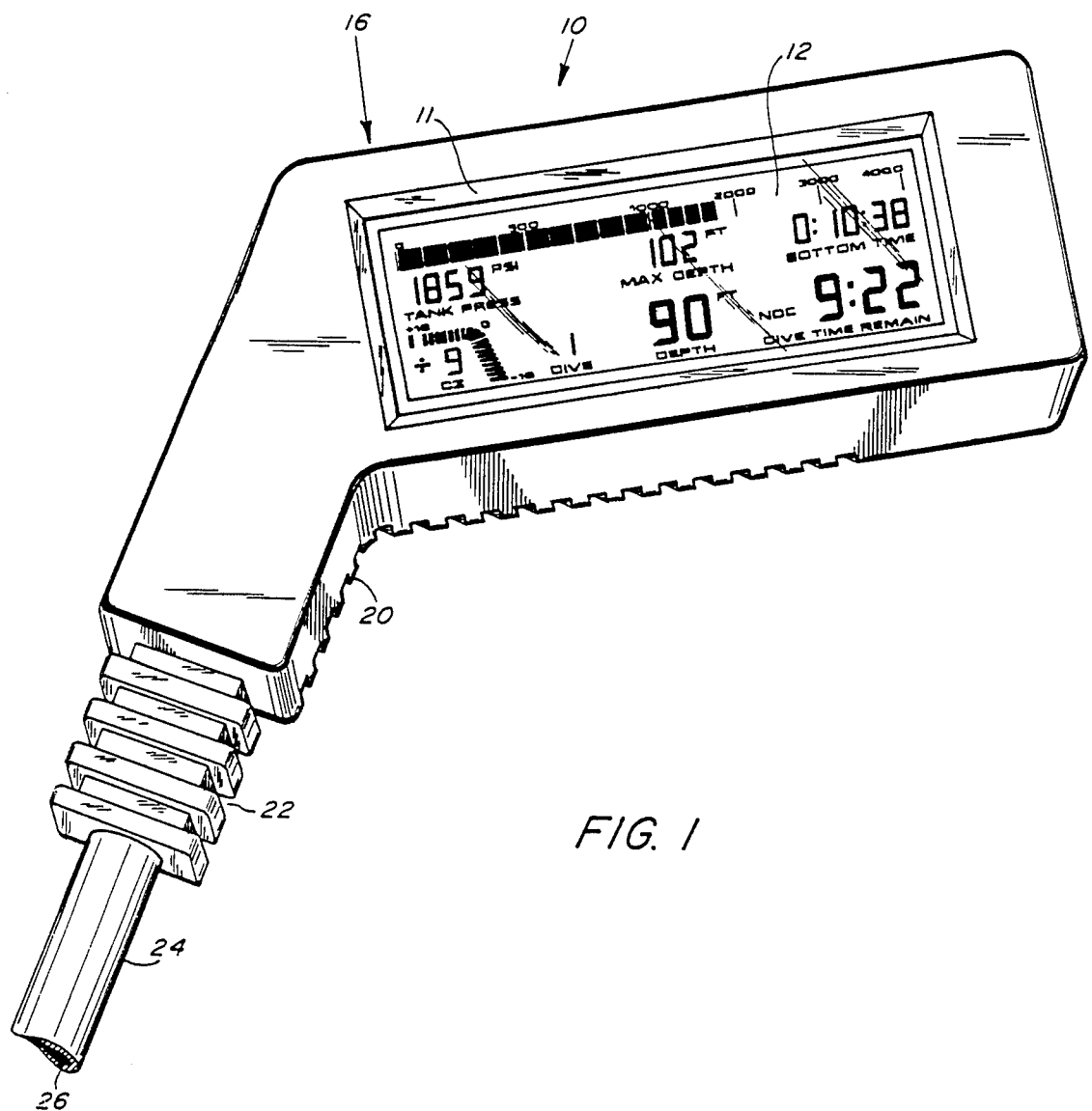
FIG. 1 shows a perspective view of the frontal portion of the depth gauge or meter wherein the information is presented.

Looking more particularly at FIG. 1, it can be seen wherein a digital depth gauge or meter 10 is shown. The term digital depth gauge, meter, gauge, digital meter and diving instrument shall be used interchangeably herein as referring to an instrument for providing a diver with information. The gauge 10 has a face plate 12. The face plate 12 has a readout such as that which can be provided by liquid crystal displays, light emitting diodes, or any other type of display in order to provide for various readouts, based upon the underlying electronic instrumentation.

As can be seen, the plate 12 incorporates thereunder an alpha numeric readout as to the dive time remaining, the time on the bottom or bottom time, with a maximum depth, the then existing depth, the tank pressure, as well as analog displays thereof and other diving information.

The foregoing alpha numeric information is provided by means of pressure transducers. The pressure transducers are such wherein they pick up the pressure against a particular surface and provide an electronic analog readout. This electronic analog readout is converted to digital information through a well known and well practiced analog to digital conversion. This analog to digital conversion can be provided to a chip to make calculations or provide other related functions and outputs. Such calculations and outputs enhance the overall function of the chip so as to create a total output and readout for a diver as to information required.

The underlying electronic instrumentation usually includes a power source such as a battery and appropriate power supply in order to have the proper voltage for the electronics of the instrument. The proper voltage for the electronics of the instrument as well as the respectively required power can be provided by a rechargeable battery and a power supply which are well known in the art.

The entire instrumentation can be encapsulated so that it is subjected to an analog input from the ambient pressure, as well as an analog input from a tank having breathing gas as pressurized therein.

Looking more specifically at the plate 12 overlying the information, it can be seen wherein a bezzle or frame 14 is shown in which the plate is mounted. The plate can be a glass or plastic plate depending upon the specific impact requirements.

The frame is formed within a boot, cover, case or shroud 16. The boot 16 is such wherein it is formed of an elastomeric, plastic, or other conformation to receive the instrumentation. The boot 16, cover, case or surrounding encapsulation means is provided with ribs 18 on the back surface. The ribs 18 continue toward a neck 20 or angular extension of the boot 16. The neck 20 or angular extension continues as a ribbed configuration 22 at the neck.

Extending from the neck 22 is a tubular member 24. The tubular member receives the pressure from the breathing gas tank through its open center conduit 26. This pressure through opening 26 can be in the form of actual pressure seen in the tank. In other cases it can be an electrical output from the high pressure gas of the breathing gas tank. In the alternative, the pressure can be seen directly through the opening 26 of the tube as it is presented to a transducer within the boot 16 in adjacent relationship or within the electronic instrumentation. Whatever way it is provided it should be understood that pressure should be seen either through a direct pressure port through the opening 26 to a transducer within the boot, or an electrical output from the area near the breathing gas tank which is then transmitted through the opening 26 to the instrumentation of the pressure gauge.

Other sources of information can be provided through the opening 26 from the area near the breathing gas tank including regulator operation, information pertaining to the ambient conditions, or anything that could be read and provided on the face plate 12 of the gauge or meter 10. Suffice it to say, information received at the face of the plate 12 is important in allowing the entire function of the diver's information requirements to be viewed thereon.

The ribs shown as ribs 18 and detailed as lands 30 and grooves 32 on the neck 22 as well as lands 34 and grooves 36 allow for a gripping of one's hand around the angled or neck portion 20. This gripping creates an ease in handling of the entire depth gauge or meter in a facile manner.

Figure 2:
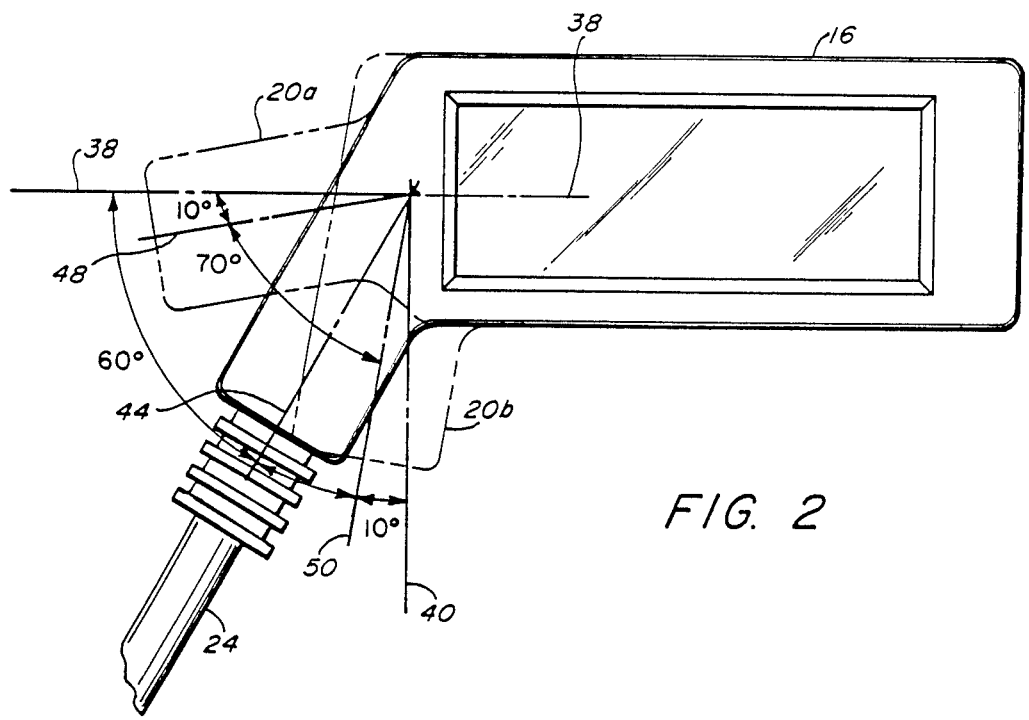
FIG. 2 shows a plan view looking downwardly on the view shown in FIG. 1.
Figure 3:
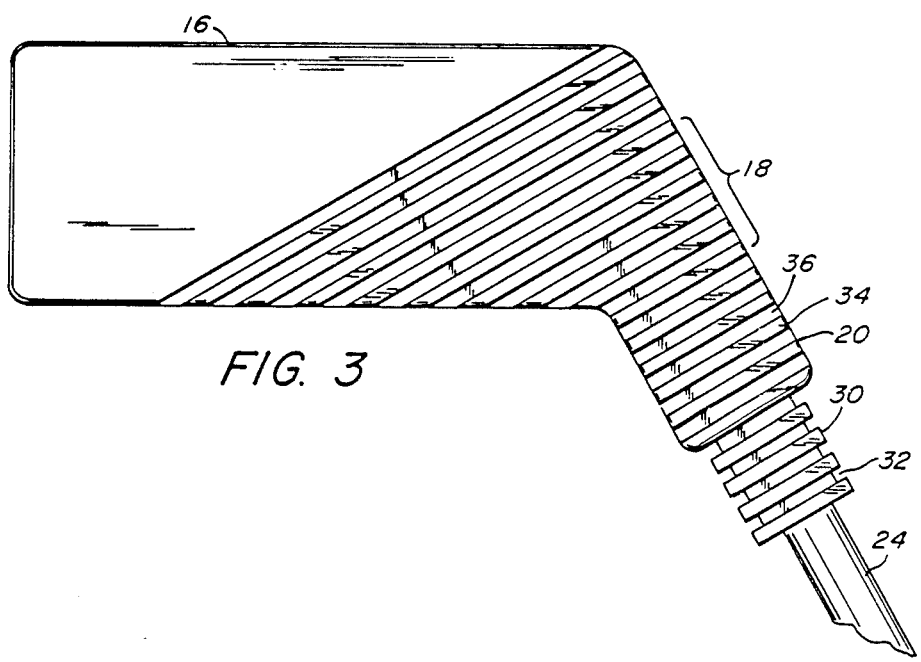
FIG. 3 shows the back of the depth gauge or meter which is hidden from view in FIG. 1.

Of significant importance is the presentation of the information to a diver. As can be seen, an axis 38 is shown through the midline area of the plate 12. This axis of information is generally within the same line of information detailed across the face of the plate 12. In other words, when reading the information on the plate 12, the reading from left to right or as viewed is generally within the general axis of one'view, namely axis or line 38. This axis of the plate 12 or line of information displayed on the gauge 10, is shown extending in the direction of the left hand side of the gauge as viewed in FIG. 2. The axis 38 is also shown having a normal or 90° line 40 extending therefrom. This normal or 90° line 40 extending from the axis 38 defines the relationship between the information on the plate 12 and the axis with respect to a 90° line from the axis of the information when reading the information.

The neck 20 including its extension 22 as shown has been extended at an angle of 60° from the axis 38. This angle can be seen as axis line 44 extending through the neck 20. This axial line 44 is at an angle of 60° thereby providing an included angle of 60° and a supplementary angle of 30° between line 44 and normal line 40.

Two additional lines are shown wherein one line 48 is shown 10° from the axis 38 and another line 50 is shown 10° from the vertical or normal line 40. Thus, an entire sweep of 70° is shown between the two respective lines 48 and 50. This defines the useful angles between the respective axes of the neck 20 and the extension 22 with the line of information or axis 38.

In particular, the neck 20 or angular extension can be seen as neck 20a extending from the boot 16 and neck 20b. These have been shown in dotted configuration in order to show the angle thereof away from the axis 38. These orientations of the neck, namely 20a and 20b, are not believed to be optimum. It is believed that the angular range of 40° to 70° from the axial or general information line 38 is deemed to be such wherein the view of the information is optimized.

The foregoing angular configurations and the ranges can vary depending upon a user. Certain users have differently configured hands, and grips. The angles that they customarily use insofar as handling material that is to be read and viewed, cause the ranges to vary within the foregoing ranges and still provide a degree of utilization of information in an optimum manner. However, it is believed that the ranges closest to 60° as shown in the 60° angular line between axes 38 and 44 are such wherein they substantially enhance the overall function of the gauge or meter 10.

The foregoing configuration can be presented in any angular configuration to enhance the user's ability to grip the neck 20 and enable the gauge to function in a responsive and readable manner. The ranges as set forth should be considered to be descriptive and any angular configuration up to the normal can be used with regard to axis 40 and line 38. However, as previously stated the preferred angle has been found to be within the foregoing ranges as set forth and particularly with regard to the range of 40° to 70° in the included angle between the axis of the neck 44 and the axis of the gauge 38. Thus, the following claims should be read broadly in light of the prior art with respect to this gauge and those of the prior art.

I claim:
1. A diver's diving meter comprising:
   means for presenting information to a diver in the form of alphanumeric information that is displayed for reading purposes in a linear direction along an axis of a diving meter;
   means for electronically providing said alphanumeric information;
   a booth surrounding at least in part said electronic means for providing said information; and,
   a neck for grasping in a diver's hand having an axis extending from said boot at an angle from the axis of the linear presentation of said alphanumeric information wherein the plane defined by said means for presenting information is substantially coplanar with the plane defined by said angle.
2. The meter as claimed in claim 1 wherein:

the axis of said neck extending from said linear presentation is at an angle from the axis thereof within the range of 10° to 80°.

3. The meter as claimed in claim 2 wherein:
said boot is made of an elastomeric material.

4. The meter as claimed in claim 2 further comprising:
ribs extending along said neck to enhance gripping by a user.

5. The meter as claimed in claim 4 further comprising:
information presented on an alphanumeric basis through a viewing port of said gauge having a transparent face plate thereover.

6. The meter as claimed in claim 1 further comprising:
a tubular member connected to said neck at one end and at the other end in fluid engagement to a high pressure port of a diver's breathing gas tank for providing conduction of pressure to said meter.

7. The meter as claimed in claim 6 further comprising:
means to register the pressure within a diver's breathing gas tank; and,
transducer means within said meter to register ambient pressure for reading on the face plate of said meter in the form of an analog of depth.

8. The combination of a boot or cover for a digital depth gauge providing alphanumeric information to a diver comprising:
a depth gauge electronic instrumentation means for sensing ambient pressure and pressure from a pressurized source of breathing gas;
means for displaying depth as an analog of ambient pressure and pressure from a source of breathing gas wherein said ambient pressure is sensed and converted to a respective depth at which said instrumentation is placed within the water, and wherein said display means is an alphanumeric representation thereof having an axis for reading said display in a given linear direction; and,
a boot for covering said instrumentation means and surrounding said display means having an extension with an axis which is at an angle from the linear direction of said display means wherein the plane defined by the display means is substantially coplanar with the plane defined by said angle.

9. The combination as claimed in claim 8 wherein:
said extension is a neck of said boot having an axis within the range of 10° to 80° degrees from the axis of said display means.

10. The combination as claimed in claim 9 wherein:
said boot is provided with ribbed gripping means.

11. The combination as claimed in claim 10 wherein:
said neck receives a tube passing therethrough at one end and wherein said tube is adapted for connection at its other end to a source of high pressure breathing gas in the breathing gas tank in order to provide monitoring of the breathing gas pressure.

12. The combination as claimed in claim 11 wherein:
said neck and said gauge are supported by said tube passing into said neck for purposes of holding said gauge and said neck for viewing purposes at the prescribed angle ranges hereof.

13. A cover combined with a digital depth gauge instrumentation and having a viewing lens that provides electronic information linearly from said instrumentation in the form of depth as an analog of pressure of the ambient and to provide a pressure reading within a user's breathing gas tank wherein the improvement to said cover comprises:
a boot surrounding the instrumentation and the viewing lens; and wherein,
the viewing lens has an axis passing therethrough in the direction of the linear information and said boot has a neck thereof with an axis extending therefrom at an angle from said viewing lens axis within the range of 10° to 80° wherein the plane defined by the linear information is substantially coplanar with the plane defined by said angle.

14. The combination as claimed within 13 wherein:
said boot is formed from an elastomeric material.

15. The combination as claimed in claim 14 wherein:
said neck and said boot have ribs thereon for gripping purposes.

16. The combination as claimed in claim 15 wherein:
the neck of said boot is adapted to receive a tube at one end providing pressure from the breathing gas tank.

17. The combination as claimed in claim 16 wherein:
the neck of said boot forms a handle for holding the digital depth gauge.

* * * * *